United States Patent
Zhu et al.

(10) Patent No.: US 9,016,105 B2
(45) Date of Patent: Apr. 28, 2015

(54) METHOD FOR MEASURING THE STRAIN OF MATERIAL USING SHORT CAVITY FIBER LASER

(71) Applicant: Beijing Information Science & Technology University, Beijing (CN)

(72) Inventors: Lianqing Zhu, Beijing (CN); Fei Luo, Winchester, MA (US); Wei He, Beijing (CN); Mingli Dong, Beijing (CN); Yinmin Zhang, Beijing (CN); Yudong Jia, Beijing (CN)

(73) Assignee: Beijing Information Science & Technology University, Beijing (CN)

( * ) Notice: Subject to any disclaimer, the term of this patent is extended or adjusted under 35 U.S.C. 154(b) by 0 days.

(21) Appl. No.: 14/049,987

(22) Filed: Oct. 9, 2013

(65) Prior Publication Data

US 2015/0020568 A1   Jan. 22, 2015

(30) Foreign Application Priority Data

Jul. 19, 2013  (CN) .......................... 2013 1 0305941

(51) Int. Cl.
 *G01L 1/24*   (2006.01)
(52) U.S. Cl.
 CPC ................. *G01L 1/242* (2013.01); *G01L 1/246* (2013.01)

(58) Field of Classification Search
 CPC ................. G01L 1/242; G01L 1/246
 See application file for complete search history.

(56) References Cited

PUBLICATIONS

Cranch, Geoffrey A. et al., "Distributed Feedback Fiber Laser Strain Sensors", Jul. 2008, IEEE Sensors Journal, vol. 8, No. 7.*
Huang, Shenghong et al., "Single-Frequency Fiber Laser From Linear Cavity With Loop Mirror Filter and Dual-Cascaded FBGs", Jun. 2005, IEEE Photonics Technology Letters, vol. 17, No. 6.*
Liu, Yange et al., "High-birefringence fiber loop mirrors and their applications as sensors", Apr. 20, 2005, Applied Optics, vol. 44, No. 12.*

* cited by examiner

*Primary Examiner* — Paul West
(74) *Attorney, Agent, or Firm* — Tim Tingkang Xia, Esq.; Morris, Manning & Martin, LLP

(57) ABSTRACT

A method for measuring the strain of material using a short cavity fiber laser, includes steps of: a) arranging the short cavity fiber laser, which laser comprises sequentially coupled laser diode pumping source, a wavelength division multiplexer, a fiber bragg grating, an active fiber and a loop mirror; b) fixing the short cavity fiber laser on the material whose strain will be measured, and matching the stretching direction of the fiber of the short cavity fiber laser with the direction of the strain produced by the material to be measured; c) measuring the drift amount of longitudinal mode output by the short cavity fiber laser; and d) calculating and obtaining the strain of the material to be measured.

13 Claims, 4 Drawing Sheets

METHOD FOR MEASURING THE STRAIN OF MATERIAL USING SHORT CAVITY FIBER LASER

CROSS-REFERENCE TO RELATED APPLICATIONS

This non-provisional application claims priority under 35 U.S.C. §119(a) on Patent Application No. 201310305941.1 filed in P.R. China on Jul. 19, 2013, the entire contents of which are hereby incorporated by reference.

TECHNICAL FIELD

The present invention relates to fiber lasers, and particularly to a method for measuring strain of material based on the longitudinal mode output by the short cavity fiber laser.

BACKGROUND OF THE INVENTION

As a laser source having broad application prospects, the fiber laser has advantages of a tunable bandwidth, a higher signal-to-noise ratio, and a narrower output laser linewidth, and can be widely used in fields such as fiber sensing, fiber communication and optical processing. The fiber laser comprises three parts of a pumping source, a resonator cavity and a gain medium. Longer the length of the cavity of the fiber laser, the nonlinear effect of the fiber laser is much substantial, thus it is necessary to shorten the length of the fiber. Meanwhile, the short cavity is an important condition to achieve single longitudinal mode operation for fiber laser. Short cavity fiber laser has a simple structure and is easy to be implemented. The short cavity fiber laser is typically consists of a pair of fiber gratings, and a gain medium connected therebetween, and this structure is called Distribute Bragg Reflection (DBR) type fiber laser. The short cavity fiber laser is usually used to generate narrow linewidth laser output. A U.S company NP Photonics utilized the 2 cm long erbium-doped phosphate glass fiber (DBR) laser to obtain the laser output with the power of 100 mW and the linewidth of 2 kHz. In 1992, Ball and others achieved a 1548 nm signal frequency output with the linewidth of 47 kHz which is consistent with Bragg wavelength using a 980 nm LD pump source by adding two Bragg gratings in the two ends of the 50 cm long Er3+ doped fiber for the first time, which the two bragg gratings are 1.25 cm long with the same bragg wavelength, and reflectance of 72% and 80% respectively. In 2007, A-FR company developed a type of fiber laser with the cavity length less than 5 cm, linewidth less than 3 kHz and output power up to 150 mW. The short cavity fiber laser has several advantages such as a few numbers of longitudinal mode output, and stable output with no mode-hopping phenomena, and it is often used in field of fiber sensing. Therefore, there are important theoretical significance and application value to design a sensing system based on longitudinal mode output by the short cavity fiber laser.

In accordance with the physics definition, when an object or material is deformed due to an external force applied thereon, an interact internal force will be produced among different parts of the material in order to counteract the effect of the external force, and this internal force will try to make the material restore to the previous position prior to the deformation. Stress is defined as the internal force per unit area at a certain point on a cross section of the material. Stress will increase with the increase of the external force. With regard to a certain kind of material, there is a limit for the stress to increase. The material will be destroyed when the stress is beyond this limit. The stress at the point of this limit is defined as the ultimate stress for the material. In order to use the material safely, the stress should be lower than the ultimate stress, otherwise the material will be destroyed. Therefore, the measurement of material stress is a very important physical indicator when the material is applied in engineering. The commonly used method for strain measuring is strain electrical measuring method, which is an experimental stress analysis method. According to the relationship between stress and strain, the stress state on the surface of the material will be determined based the strain on the surface of the material measured by a resistance strain gage. However, the accuracy of this method for measuring the strain is not high, so it cannot satisfy the needs for high precision in some applications.

Therefore, a method and system for accurately measuring the deformation of the material is needed using the features of the short cavity fiber laser, which method and system may utilize the longitudinal mode output by the fiber laser as a sensing system.

SUMMARY OF INVENTION

According to one aspect of the present invention, a method for measuring the strain of material using a short cavity fiber laser is provided, the method comprising steps of a) arranging the short cavity fiber laser, which laser comprises sequentially coupled laser diode pumping source, a wavelength division multiplexer, a fiber bragg grating, an active fiber and a loop mirror; b) fixing the short cavity fiber laser on the material whose strain will be measured, and matching the stretching direction of the fiber of the short cavity fiber laser with the direction of the strain produced by the material to be measured; c) measuring the drift amount of longitudinal mode output by the short cavity fiber laser; and d) calculating and obtaining the strain of the material to be measured.

Preferably, the calculating in the step d) is to read the strain corresponding to the drift of output longitudinal mode as measured in the step c), based on the calibrated relation curve between the drift of longitudinal mode output by the short cavity fiber laser and the material strain.

Preferably, the relation curve between the drift of longitudinal mode output by the short cavity fiber laser and the strain of strain calibration material is calibrated through changing the strain produced by the material by fixing the short cavity fiber laser on the strain calibration material with known and variable strain.

Preferably, the relation curve is obtained by linear fitting or least square fitting.

Preferably, the active fiber of the short cavity fiber laser is selected from erbium-doped fiber, ytterbium-doped fiber or Er/Yb co-doped fiber.

Preferably, the strain calibration material has a shape of plate, and the strain of the strain calibration material is changed by applying a heavy object.

Preferably, the strain calibration material has a shape of plate, and the strain of the strain calibration material is changed by vibration of an applied motor.

Preferably, the short cavity fiber laser is fixed on the material whose strain by a fixing unit made of epoxy resin or acrylate.

Preferably, the material of the strain calibration material is metal.

Preferably, the loop mirror comprises a coupler with the splitting ratio of 0.50.

According to the present invention, the strain of material can be measured accurately utilizing the features of the short cavity fiber laser. The arranged fiber laser has a small and simple structure, high measuring accuracy, good portability, and can be used in a variety of occasions.

It should be understood that the foregoing general description and the following detailed description are merely exemplary explanation, and shall not be construed as limiting the contents as claimed by the invention.

BRIEF DESCRIPTION OF DRAWINGS

Further objects, functions, and advantages of the present invention will be explained in details by embodiments of the present invention with reference to the accompanying drawings, in which FIG. 1 schematically shows a short cavity fiber laser system for measuring strain of material according to the first embodiment of the present invention.

DETAILED DESCRIPTION OF INVENTION

Figure 1:
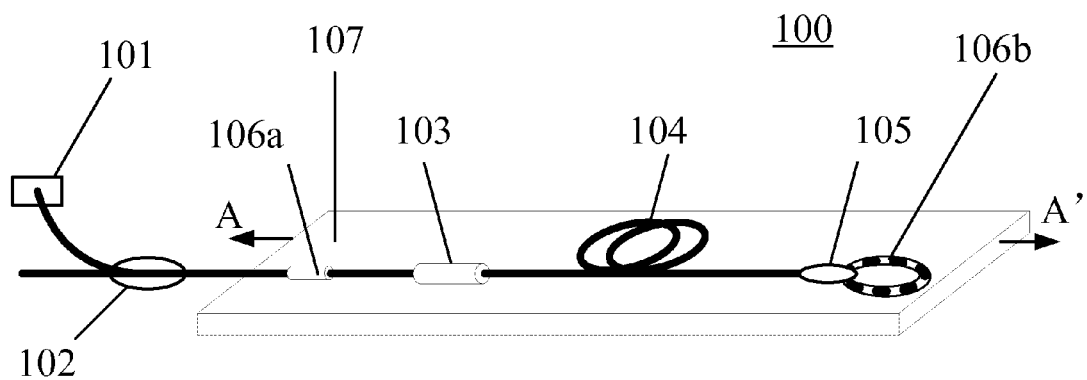

Hereinafter, embodiments of the present invention will be explained in details with reference to drawings. In the accompanying drawings, like reference numerals designate the same or similar parts, or the same or similar procedures.

With reference to the exemplary embodiments, the purpose and function of the present invention and method to achieve these purpose and function will be explained. However, the present invention is not limited to the disclosed exemplary embodiments, and can be implemented with different forms. The description in nature is merely to help those skilled in the art to comprehensively understand the specific details of the invention.

The present invention will be described in detail with reference to the schematic figures. For the purpose of explanation, when describing the invention in details, the sectional figures representing the device structure will be partial enlarged not in general proportion, and the schematic figures are only exemplary and not intended to limit the scope claimed by the invention. Moreover, it should comprise three space dimensions of length, width and depth in the actual production.

The present invention provides a method for measuring strain of material using longitudinal mode output by the short cavity fiber laser. The short cavity fiber laser according to the present invention uses a laser diode as the pumping source for the fiber laser, and an active fiber doped with rare-earth elements as the gain medium for the fiber laser, together with the fiber bragg grating (FBG), a fiber loop mirror (FLM), and a wavelength division multiplexer (WDM) to achieve the calibration and measurement of the strain.

Resonance will occur in the laser when the cavity length of the laser resonator cavity is an integer multiple of the half wavelength of laser. Therefore, theoretically, there is infinite number of wavelength producing resonance in resonator cavity. The interval between two adjacent resonant frequencies is referred as Free Spectral Range (FSR), and the optical path difference between two adjacent lasers is $\Delta=2nL$, wherein n is refractive index of the medium, L is physical length of the resonator cavity. Free Spectral Range (FSR) is the frequency interval between adjacent longitudinal mode output by the laser, and its physical meaning is the reciprocal of the time spend by a photon when making a round trip in the resonator cavity, and can be derived by the light speed in the vacuum c as:

$$FSR = \Delta v_q = \frac{c}{\Delta} = \frac{c}{2nL} \quad (1)$$

$$\Delta v_q = v_{q+1} - v_q \quad (2)$$

Therefore the cavity length of the resonator is shorter, the Free Spectral Range is larger, and wavelength may product resonance within the wavelength of gain provided by gain medium is lesser, which helps to reduce the number of modes of output laser. So a shorter cavity length L can reduce the number of the longitudinal mode output, and is convenient for measuring interval of the modes. Stretching or shrinking of the resonator cavity length L will occur when the strain of the resonator cavity changes, so drift of the longitudinal mode output by the laser will occur. By calibrating the drift of the longitudinal mode output, the curve of the longitudinal mode drifting as the changes of strain will be fitted, according to which the strain within the scope of calibration can be measured.

Arranging the Short Cavity Fiber Laser System

FIG. 1 schematically shows the short cavity fiber laser system 100 for measuring strain of material according to the first embodiment of the present invention, which comprises a short cavity fiber laser comprising sequentially coupled laser diode pumping source 101, a wavelength division multiplexer 102, a fiber bragg grating 103, an active fiber 104 and a loop mirror 105. The laser diode pumping source 101, the wavelength division multiplexer 102, the fiber bragg grating 103, the active fiber 104 and the loop mirror 105 can be arranged by means of fusion welding. The short cavity fiber laser 100 is fixed on material 107 producing strain by fixing units 106a and 106b. The active fiber 104 is used as a gain medium for the short cavity fiber laser. The fiber bragg grating 103 and the loop mirror 105 form as the two reflection ends of the resonator cavity. The wavelength division multiplexer 102 is used to couple the pumping light produced by the laser diode pumping source 101 into the active fiber 104. The fixing units 106a and 106b may be Epoxy Resin or Acrylate as adhesive, and for example, the fiber bragg grating 103 and the loop mirror 105 may be fixed on the surface of the material 107 by means of the adhesive.

When the longitudinal mode output by the fiber laser is used to measure the strain of the material 107, the strain direction of the material 107 should be consistent with the stretching direction of the active fiber 104. The strain direction of the material 107 is shown as arrow A in FIG. 1. When the strain of the material 107 along the direction A changes, for example, the material 107 stretches towards the respective ends along the arrow A-A' in FIG. 1, the cavity length of the short fiber laser attached to the material 107 will increase, which leads that the longitudinal mode output by laser drifts towards the long wave, that is, the drift of the longitudinal mode output by laser decrease. When the material 107 shrinks along the arrow A-A' in FIG. 1, the cavity length of the short fiber laser attached to the material 107 will decrease, which leads that the longitudinal mode output by laser drifts towards the short wave, that is, the drift of the longitudinal mode output by laser increase.

The active fiber 104 may have a shorter length (for example, in cm order of magnitude), preferably doped with rare-earth elements and having a high doping concentration (for example, Er/Yb co-doped with the peak value absorption at 40±10 dB/m@1535 nm), so as to lower the pumping threshold of the system. The fiber bragg grating 103 has a higher reflectance (reflectance is more than 90% for some specific wavelength) to reduce the number of longitudinal modes output by laser. The center wavelength of the fiber bragg grating 103 determines the center wavelength of the laser output. The laser diode pumping source 101 is selected according to adsorption lines of the doped rare-earth element of the active fiber 104. The parameters of the wavelength division multiplexer 102, the fiber bragg grating 103 and the loop mirror 105 according to the embodiment of the invention need to match with the parameters of the pump wavelength, laser output wavelength, and active fiber. The specific parameters are shown in Table 1.

TABLE 1

Parameters of the short cavity fiber laser according to the present invention

| Doping element | Peak absorption | Cutoff wavelength | Cladding core diameter | Laser output wavelength | WDM wavelength | FLM wavelength |
|---|---|---|---|---|---|---|
| Er | 30 dB/m@1530 nm<br>80 dB/m@1530 nm | 800-980 nm | Single mode | 1530 nm-1560 nm | 976/1550 nm | 1550 nm |
| Yb | 280 ± 50 dB/m@920 nm<br>0.6 ± 0.2 dB/m@920 nm<br>1.8 ± 0.4 dB/m@920 nm | 1010 ± 70 nm | 125 μm | 1060 nm-1090 nm | 915/1064 nm | 1064 nm |
| Erbium-Ytterbium co-doped | 0.75 ± 0.15 dB/m@915 nm<br>40 ± 10 dB/m@1535 nm | 1440 ± 80 nm | | 1530 nm-1560 nm | 976/1550 nm | 1550 nm |

According to the present invention, the core diameter of the fiber is determined by the active fiber as adopted. The cladding core diameter is preferably 125 μm, and the inner diameter of the fiber may be 4 μm, 8 μm or 10 μm, preferably 10/125 μm. Corresponding core diameter of FLM, WDM and LD tail fiber will be chosen according to the selected core diameter. Pump wavelength matching the Erbium-doped fiber may be 980 nm or 1480 nm, pump wavelength matching the Ytterbium-doped fiber may be 976 nm or 915 nm, and pump wavelength matching the Er—Yb co-doped fiber may be 976 nm. The parameters of FLM and WDM may be determined according to the wavelength and core diameter. The ultimate wavelength output by the laser is within a certain gain range of the active fiber (such as 1530-1560 nm), and is determined by the reflected wavelength of fiber bragg grating. The typical emission wavelength of the Erbium-doped fiber is 1535 nm, and the typical emission wavelength of the Ytterbium-doped fiber is 1064 nm, and the typical emission wavelength of the Er—Yb co-doped fiber is 1550 nm.

For example, in the present embodiment, if 10/125 μm core diameter Erbium-doped fiber is selected as the gain medium, the LD tail fiber, WDM and FLM will be the same type of core diameter. The output wavelength of LD is 976 nm, the operating wavelength of WDM is 976/1550 nm, the operating wavelength of FLM is 1550 nm, and FBG is selected to be in the range of 1530 nm-1560 nm, within which range laser output can be obtained. If 10/125 μm core diameter Ytterbium-doped fiber is selected as the gain medium in the present embodiment, the LD tail fiber, WDM and FLM will be the same type of core diameter. LD is single mode output at 915 nm, the operating wavelength of WDM is 915/1064 nm, the operating wavelength of FLM is 1064 nm, and FBG is selected to be near 1064 nm, within which range laser output can be obtained.

Figure 2:
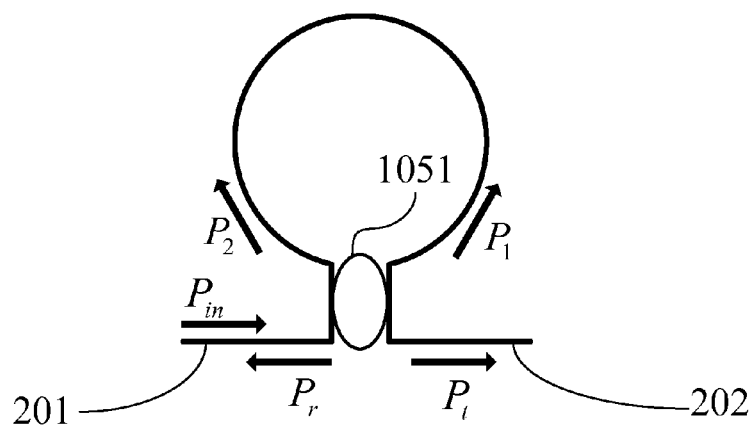
FIG. 2 is functional diagram of the loop mirror as shown in FIG. 1.

FIG. 2 shows the operating principle of loop mirror 105 in FIG. 1. As shown in FIG. 2, the loop mirror 105 according to the present invention is made by fusing two output terminals of coupler 1051. When the signal light $P_{in}$ is inputted from the signal input terminal 201, the signal light is divided into two beams at two output terminals of coupler 1051, which two beams are light $P_1$ transmitted counterclockwise in FIG. 2 and light $P_2$ transmitted clockwise in FIG. 2. $P_1$ and $P_2$ are coherent in coupler 1051 after transmitting, and the reflected light $P_r$ is emitted from the signal input terminal 201, and the transmitted light $P_t$ is emitted from the signal output terminal 202. Assuming the splitting ratio of the coupler 1051 is k, on the condition of ignoring the loss of the coupler 1051 itself and the fiber, when the input light power is $P_{in}$, the reflected light power $P_r$ and transmitted light power $P_t$ are as follows:

$$P_r = 4k(1-k)P_{in} \quad (3)$$

$$P_t = (1-2k)^2 P_{in} \quad (4)$$

Reflectivity R and transmittance T of the fiber loop mirror obtained from formula (3) and (4) are as follows:

$$R = 4k(1-k) \quad (5)$$

$$T = (1-2k)^2 \quad (6)$$

Therefore when the splitting ratio k=0.50, R=1 and T=0, the loop mirror 105 has the highest reflectivity, and play a role of loop reflection mirror. So according to a preferred embodiment of the present invention, the splitting ratio of the coupler 1051 in the loop mirror 105 is 50:50, that is, k=0.50.

Calibration and Measurement of Strain

Before measuring the strain using the short cavity fiber laser system according to the invention, the relationship between the change of longitudinal mode output by the short cavity fiber laser and the corresponding strain shall be calibrated using known and variable strain, and the corresponding curve for the relationship is also needed to be drawn. The short cavity fiber laser system according to the invention is fixed on a measuring piece made of the material which may produce strain, the strain produced by the measuring piece will increase or decrease by gradually increase or decrease the external force on the measuring piece. The strain and the increased or decreased value of drift of longitudinal mode output by the short cavity fiber laser corresponding to the strain will be recorded, and then a curve of change of longitudinal mode changed with the strain can be obtained. Therefore, the strain may be calibrated or measured using the changes of longitudinal mode output based on the corresponding relationship of their changes.

Figure 3:
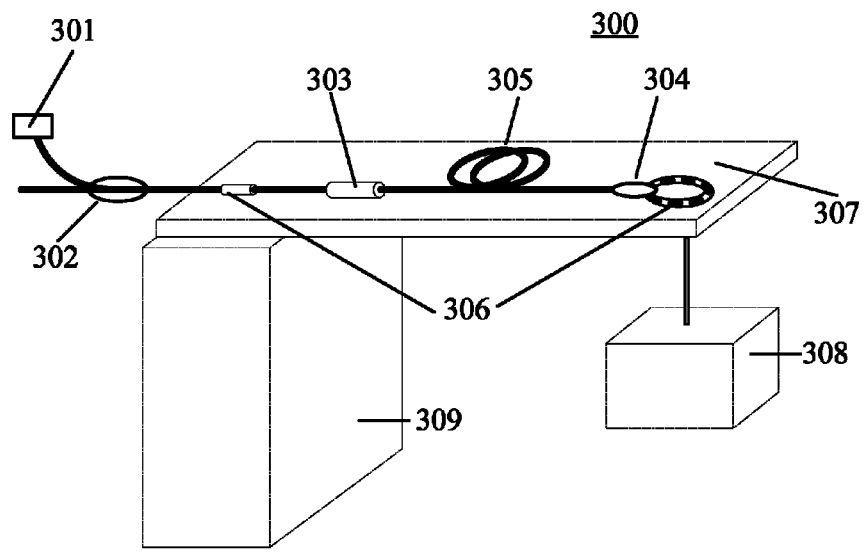
FIG. 3 schematically shows a short cavity fiber laser system for calibrating the strain measurement according to the second embodiment of the present invention.

FIG. 3 schematically shows the short cavity fiber laser system 300 for calibrating the strain measurement material according to the second embodiment of the present invention, which comprises sequentially coupled short cavity fiber laser comprising of a laser diode pumping source 301, a wavelength division multiplexer 302, a fiber bragg grating 303, an active fiber 304 and a loop mirror 305. The laser diode pumping source 301, the wavelength division multiplexer 302, the fiber bragg grating 303, the active fiber 304 and the loop mirror 305 can be arranged by means of fusion welding. The short cavity fiber laser 300 is fixed on plate-shaped strain calibration material 307 by a fixing unit 306. The strain calibration material 307 is fixed on the platform 309 on one end, and is applied with external force by hanging a heavy object 308 on the other end, which will cause the strain calibration material 307 to produce strain correspondingly. During the calibration, the strain calibration material 307 is preferably made of metal. The heavy object 308 may be weights with different known weight. By gradually increasing the weight of the weights, the strain calibration material 307 will deform, which leads the physical cavity length of the laser to change. Then drift of longitudinal mode output will change. The increased or decreased value of drift of longitudinal mode output is recorded, and then a curve of change of longitudinal mode changed with the strain can be obtained.

The active fiber 304 doped with rare-earth element is used as gain medium of the short cavity fiber laser. The fiber bragg grating 303 and the loop mirror 305 form the two reflection ends of the resonator cavity. The wavelength division multiplexer 302 is used to couple the pumping light produced by the laser diode pumping source 301 into the active fiber 304. The fixing unit 306 may be Epoxy Resin or Acrylate as adhesive, and the two ends of the fiber bragg grating 303 and loop mirror 305 are fixed on the surface of the strain calibration material 307 by means of the adhesive.

The selection of the parameters of the wavelength division multiplexer 302, the fiber bragg grating 303 and the loop mirror 305 needs to match with the parameters of the pump wavelength, laser output wavelength, and active fiber parameters. The specific parameters may be selected with reference to Table 1.

Figure 4:
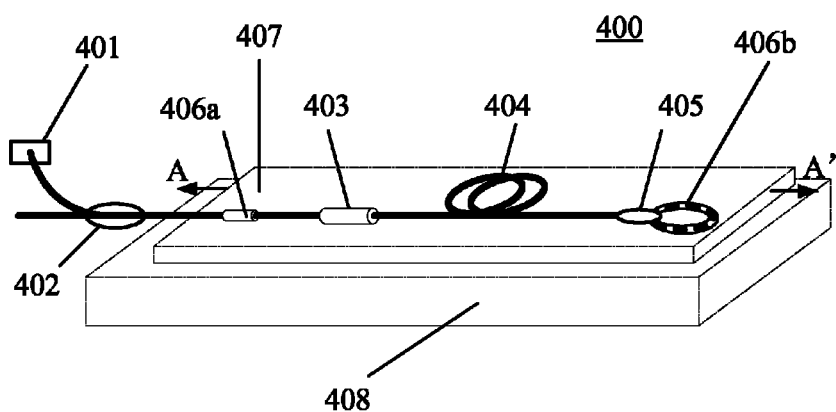
FIG. 4 schematically shows a short cavity fiber laser system for calibrating the strain measurement according to the third embodiment of the present invention.

FIG. 4 schematically shows the short cavity fiber laser system 400 for calibrating the strain measurement according to the third embodiment of the present invention, which comprises a short cavity fiber laser comprising sequentially coupled laser diode pumping source 401, a wavelength division multiplexer 402, a fiber bragg grating 403, an active fiber 404 and a loop mirror 405. The laser diode pumping source 401, the wavelength division multiplexer 402, the fiber bragg grating 403, the active fiber 404 and the loop mirror 405 can be arranged by means of fusion welding. The short cavity fiber laser 400 is fixed on plate-shaped strain calibration material 407 by a fixing unit 406. The strain calibration material 407 is connected with a vibration motor 408, and applied with external force by the vibration caused by driving the motor 408, which will cause the strain calibration material 407 to deform, for example, to extend or shrink along the direction A as shown in the figure and produce strain correspondingly. During the calibration, the strain calibration material 407 is preferably made of metal. The rotation speed of the motor 408 may be adjusted and recorded. By gradually increasing the rotation speed, the strain calibration material 407 will deform, which leads the physical cavity length of the laser to change. Then drift of longitudinal mode output will change. The increased or decreased value of drift of longitudinal mode output is recorded, and then a curve of change of longitudinal mode changed with the strain can be obtained.

The active fiber 404 doped with rare-earth element is used as the gain medium of the short cavity fiber laser. The fiber bragg grating 403 and the loop mirror 405 form as the two reflection ends of the resonator cavity. The wavelength division multiplexer 402 is used to couple the pumping light produced by the laser diode pumping source 401 into the active fiber 404. The fixing unit 406 can be Epoxy Resin or Acrylate as adhesive, and the two ends of the fiber bragg grating 403 and loop mirror 405 are fixed on the surface of the strain calibration material 407 by means of the adhesive.

The selection of the parameters of the wavelength division multiplexer 402, the fiber bragg grating 403 and the loop mirror 405 needs to match with the parameters of the pump wavelength, laser output wavelength, and active fiber parameters. The specific parameters may be selected with reference to Table 1.

The change of the applied force will cause changes of the extrusion shape and size of the strain material, which will lead to stretching, bending, vibration or extrusion of the resonator cavity of the laser fixed on the strain material, and corresponding elongation or shortening of the length of the resonator cavity. Then the longitudinal mode of laser output by the laser will drift. Specifically, when the cavity length is elongated, the longitudinal mode output will drift towards the long wave; when the cavity length is shortened, the longitudinal mode will drift towards the short wave. By gradually increasing the magnitude of the applied external force and recording the corresponding drift value of the longitudinal mode, a curve can be fitted based on the recorded data to as to make a calibration, the curve of the drift of longitudinal mode changed with the strain will be obtained.

The drift of the center wave length $\lambda_B$ of laser grating caused by material stress is, $$\Delta\lambda_B 2n_{eff} \Box \Lambda + 2 \Box n_{eff} \Lambda \qquad (7)$$

Wherein $\Delta\Lambda$ represents elastic deformation of the fiber itself under the stress; $\Delta n_{eff}$ represents the elastic-optic effect of the fiber. The different stress state will lead to different changes of $\Delta\Lambda$ and $\Delta n_{eff}$.

According to the general form of Hooke's law, $$\sigma_i C_{ij} \cdot \epsilon_j \ (i,j=1,2,3,4,5,6) \qquad (8)$$

Wherein $\sigma_i$ is stress tensor, $C_{ij}$ is elastic modulus, and $\epsilon_j$ is strain tensor.

As for isotropic media, $C_{ij}$ can be simplified due to the symmetry of material, then, $$\begin{bmatrix} \sigma_1 \\ \sigma_2 \\ \sigma_3 \\ \sigma_4 \\ \sigma_5 \\ \sigma_6 \end{bmatrix} = \begin{bmatrix} \lambda+2\mu & \lambda & \lambda & 0 & 0 & 0 \\ \lambda & \lambda+2\mu & \lambda & 0 & 0 & 0 \\ \lambda & \lambda & \lambda+2\mu & 0 & 0 & 0 \\ 0 & 0 & 0 & \mu & 0 & 0 \\ 0 & 0 & 0 & 0 & \mu & 0 \\ 0 & 0 & 0 & 0 & 0 & \mu \end{bmatrix} \cdot \begin{bmatrix} \epsilon_1 \\ \epsilon_2 \\ \epsilon_3 \\ \epsilon_4 \\ \epsilon_5 \\ \epsilon_6 \end{bmatrix} \qquad (9)$$

Wherein $\lambda$ and $\mu$ represents elasticity modulus, and can be expressed by elastic modulus E and Poisson's ratio $\nu$, $$\begin{cases} \lambda = \dfrac{v \cdot E}{(1+v) \cdot (1-2v)} \\ \mu = \dfrac{E}{2(1+v)} \end{cases} \quad (10)$$

The above formula (10) is the general form of Hooke' law in homogeneous medium.

As shown in FIG. 3, the force affecting on the fiber grating is uniform axial stress. Since the fiber grating itself has isotropic cylinder structure, the stress applied on it can be resolved into three directions, $\sigma_r$, $\sigma_\theta$, and $\sigma_z$ in cylindrical coordinates. The stress in these directions is, $$\sigma_{zz} = -P \quad (11)$$

$$\sigma_{rr} = \sigma_{\theta\theta} = 0 \quad (12)$$

Wherein P is the pressure stress.
According to the formula (9), there is $$\begin{bmatrix} \varepsilon_{rr} \\ \varepsilon_{\theta\theta} \\ \varepsilon_{zz} \end{bmatrix} = \begin{bmatrix} v\dfrac{P}{E} \\ v\dfrac{P}{E} \\ -\dfrac{P}{E} \end{bmatrix} \quad (13)$$

Wherein E and $v$ represent elastic modulus and Poisson's ratio of the silica fiber respectively.
Formula (7) is expanded as follows, $$\Delta \lambda_{B_z} = 2\Lambda \left( \dfrac{\partial n_{\mathit{eff}}}{\partial L} \Delta L + \dfrac{\partial n_{\mathit{eff}}}{\partial \alpha} \Delta \alpha \right) + 2 \dfrac{\partial \Lambda}{\partial L} \Delta L \cdot n_{\mathit{eff}} \quad (14)$$

Wherein $\Delta L$ represents the longitudinal expansion amount of the fiber, $\Delta \alpha$ represents diameter change of the fiber caused by longitudinal tensile, $$\dfrac{\partial n_{\mathit{eff}}}{\partial L}$$

represents elastic-optic effect, and $$\dfrac{\partial n_{\mathit{eff}}}{\partial \alpha}$$

represents waveguide effect. The relative dielectric impermeability tensor $\beta_{ij}$ may be expressed by the dielectric constant $\in_{ij}$ as follow, $$\beta_{ij} = \dfrac{1}{\varepsilon_{ij}} = \dfrac{1}{n_{ij}^2} \quad (15)$$

Wherein $n_{ij}$ is fiber refractive index in a certain direction. Since only the effective refractive index of fiber grating will be considered in the present invention, the above expression can be converted into:

$$\Delta(\beta_{ij}) = \Delta\left(\dfrac{1}{n_{ij}^2}\right) = -2\dfrac{\Delta n_{\mathit{eff}}}{n_{\mathit{eff}}^3} \quad (16)$$

Figure 5:
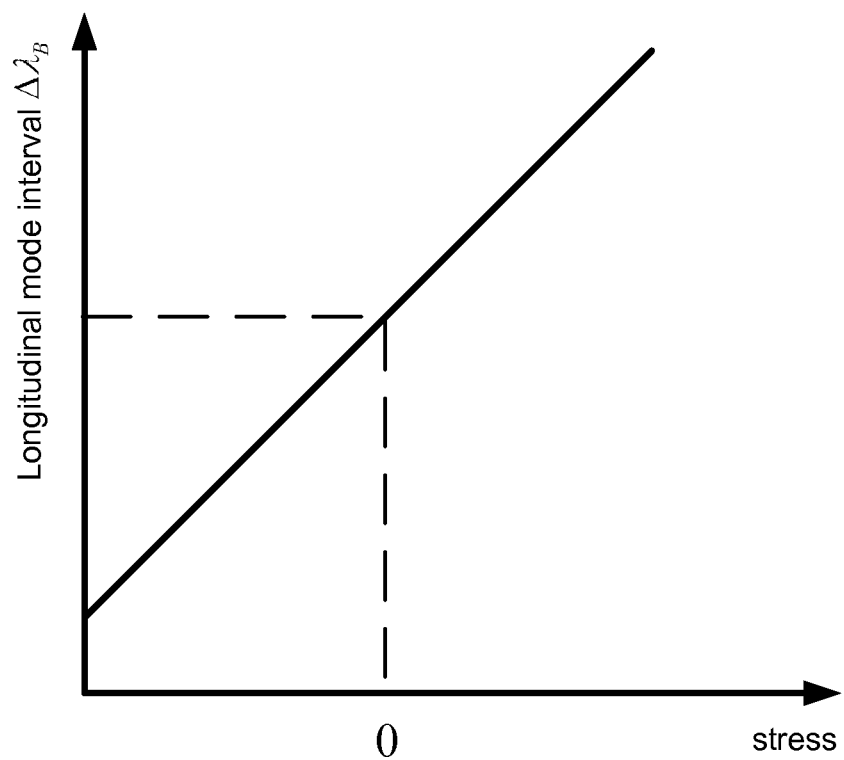
FIG. 5 is a fitted relation curve between stress and drift of longitudinal mode output by laser.

Since $$\Delta n_{\mathit{eff}} = \dfrac{\partial n_{\mathit{eff}}}{\partial L},$$

the formula (16) can be converted into, $$\Delta \lambda_{B_z} = 2\Lambda \left[ -\dfrac{n_{\mathit{eff}}^3}{2} \Delta\left(\dfrac{1}{n_{\mathit{eff}}^2}\right) \right] + 2 n_{\mathit{eff}} \cdot \varepsilon_{zz} \cdot L \cdot \dfrac{\partial \Lambda}{\partial L} \quad (17)$$

Wherein $\Delta_{zz} = \Delta L/L$ is longitudinal strain.
The data will be recorded so as to fit as a curve and make calibration. The calibration result is as shown in FIG. 5. The curve fitting may use linear fitting, as shown in formula (18).

$$y = ax + b \quad (18)$$

Alternatively, the curve fitting may be the least square fitting, and the curve as fitted can be obtained by formulas (19) and (20).

$$\dfrac{\partial S}{\partial a_0} = \sum_{i=0}^{n} (y_i - a_0 - a_1 x_i) = 0 \quad (19)$$

$$\dfrac{\partial S}{\partial a_1} = \sum_{i=0}^{n} (y_i - a_0 - a_1 x_i) x_i = 0 \quad (20)$$

By solving the above equations, $a_0$ and $a_1$ is obtained, and an approximating function satisfying the square approximation condition is obtained as, $$f(x) = a_0 + a_1 x \quad (21)$$

Finally, the applied stress can be measured by the relationship curve between the stress intensity and the drift amount of the longitudinal mode output by the laser. Using the stress calibration curve, the magnitude of the stress of the resonator cavity can be determined.

Figure 6:
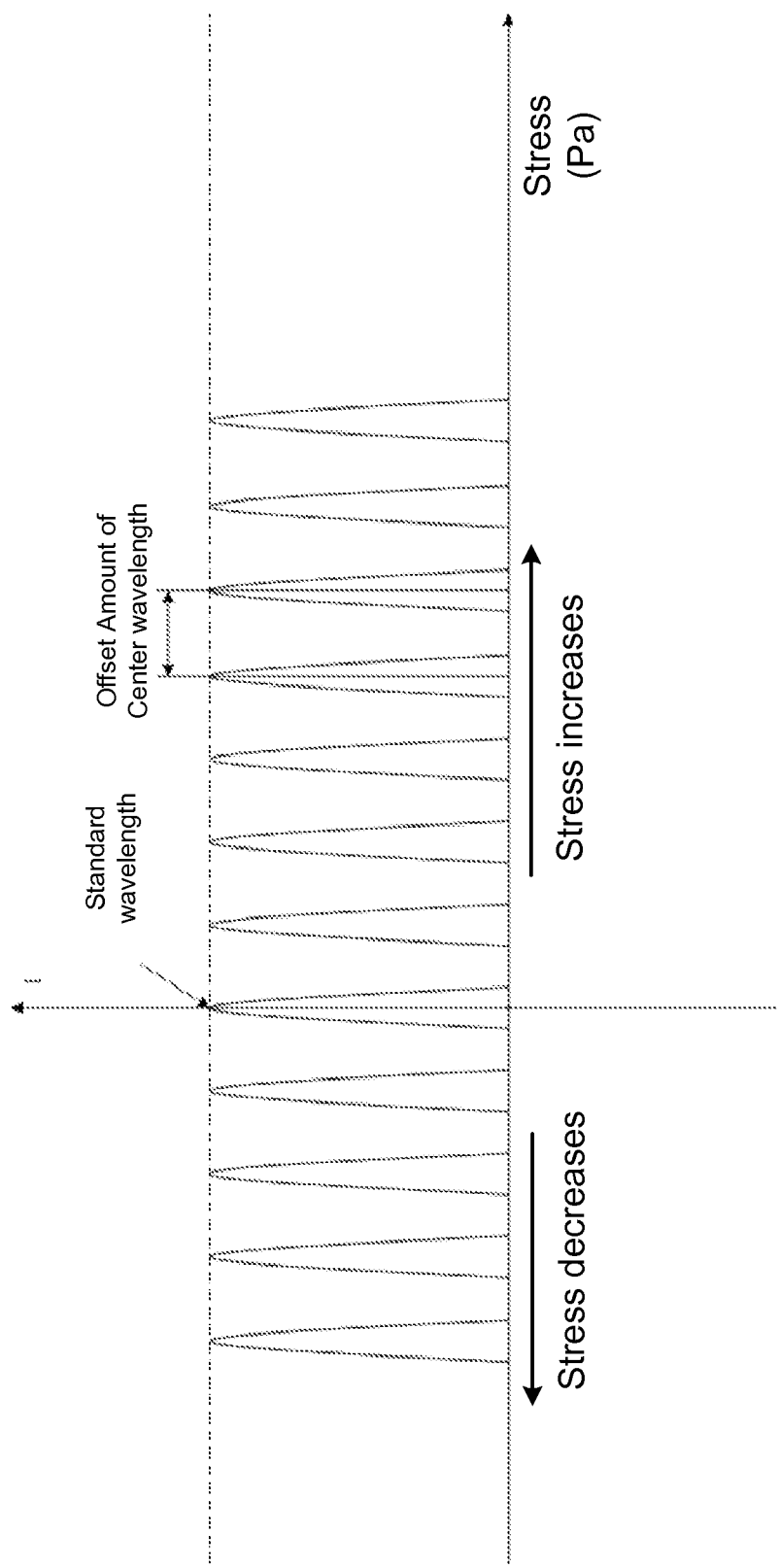
FIG. 6 is a waveform graph showing the drift of longitudinal mode output by laser changed with the change of strain.

FIG. 6 shows the waveform graph of the drift amount of longitudinal mode output by the laser changes as the applied stress changes. As shown in FIG. 6, the laser according to the present invention is a single longitudinal mode output. A wavelength at specific stress is calibrated as a standard wavelength. When the stress increases, the center wavelength of the standard wavelength offsets to the right side of the figure, and when the stress decreases, the center wavelength of the standard wavelength offsets to the left side of the figure. By collecting the changes of the wavelength $\lambda_B$ output by the laser by a spectrometer, the offset amount of the center wavelength can be obtained, and then the stress to be measured can be obtained referring to the curve.

According to the present invention, the stress can be measured accurately utilizing the features of the short cavity fiber laser. The arranged fiber laser has a small and simple structure, high measuring accuracy, good portability, and can be used in a variety of occasions.

Combined with the disclosed description and practice of the present invention, it is easy for those skilled in the art to contemplate and understand other embodiments of the invention. The description and embodiments are merely exemplary, and the scope and spirit of the invention will be limited by the claims.

What is claimed is:

1. A method for measuring a strain of a material using a short cavity fiber laser, the method comprising steps of:
   a) arranging the short cavity fiber laser, wherein the short cavity fiber laser comprises sequentially a coupled laser diode pumping source, a wavelength division multiplexer, a fiber Bragg grating, an active fiber and a loop mirror;
   b) fixing the short cavity fiber laser on the material whose strain will be measured, and matching the stretching direction of the active fiber of the short cavity fiber laser with the direction of the strain produced by the material to be measured;
   c) measuring a drift of a longitudinal mode,
   wherein the drift is outputted by the short cavity fiber laser; and
   wherein the drift is generated by stretching of the material; and
   d) calculating and obtaining the strain of the material to be measured according to the drift from an equation of:

$$\Delta \lambda_{B_z} = 2\Lambda \left[ -\frac{n_{eff}^3}{2} \Delta \left( \frac{1}{n_{eff}^2} \right) \right] + 2n_{eff} \cdot \varepsilon_{zz} \cdot L \cdot \frac{\partial \Lambda}{\partial L},$$

wherein $\Delta \lambda_{B_z}$ represents the drift of the longitudinal mode, $\Lambda$ represents elastic deformation of the fiber under the stress, $n_{eff}$ represents the elastic-optic effect of the fiber, $\Delta n_{eff}$ represents the change of the elastic-optic effect of the fiber, $\varepsilon_{zz}$ is longitudinal strain, and L represents the longitudinal expansion amount of the fiber.

2. The method according to claim 1, wherein the active fiber of the short cavity fiber laser is selected from erbium-doped fiber, ytterbium-doped fiber or Er/Yb co-doped fiber.

3. The method according to claim 1, wherein the short cavity fiber laser is fixed on the material by a fixing unit, and the fixing unit is made of epoxy resin or acrylate.

4. The method according to claim 1, wherein the loop mirror comprises a coupler with a splitting ratio of 0.50.

5. A method for measuring the strain of a material using a short cavity fiber laser, the method comprising steps of:
   a) arranging the short cavity fiber laser, wherein the short cavity fiber laser comprises sequentially a coupled laser diode pumping source, a wavelength division multiplexer, a fiber Bragg grating, an active fiber and a loop mirror;
   b) fixing the short cavity fiber laser on the material whose strain will be measured, and matching the stretching direction of the active fiber of the short cavity fiber laser with the direction of the strain produced by the material to be measured;
   c) measuring a drift of a longitudinal mode,
   wherein the drift is outputted by the short cavity fiber laser; and
   wherein the drift is generated by stretching of the material; and
   d) calibrating and fitting a relation curve representing relationship between the drift of longitudinal mode output by the short cavity fiber laser and the strain using known and variable strain according to the drift from an equation of:

$$\Delta \lambda_{B_z} = 2\Lambda \left[ -\frac{n_{eff}^3}{2} \Delta \left( \frac{1}{n_{eff}^2} \right) \right] + 2n_{eff} \cdot \varepsilon_{zz} \cdot L \cdot \frac{\partial \Lambda}{\partial L},$$

wherein $\Delta \lambda_{B_z}$ represents the drift of the longitudinal mode, $\Lambda$ represents elastic deformation of the fiber under the stress, $n_{eff}$ represents the elastic-optic effect of the fiber, $\Delta n_{eff}$ represents the change of elastic-optic effect of the fiber, $\varepsilon_{zz}$ is longitudinal strain, L represents the longitudinal expansion amount of the fiber; and
   e) reading the strain corresponding to the drift of output longitudinal mode as measured in the step c), based on the calibrated relation curve.

6. The method according to claim 5, wherein the relation curve is calibrated through changing the strains produced by the strain calibration material by fixing the short cavity fiber laser on the strain calibration material with known and variable strain.

7. The method according to claim 5, wherein the relation curve is obtained by linear fitting or least square fitting.

8. The method according to claim 5, wherein the active fiber of the short cavity fiber laser is selected from erbium-doped fiber, ytterbium-doped fiber or Er/Yb co-doped fiber.

9. The method according to claim 5, wherein the strain calibration material has a shape of plate, and the strain of the strain calibration material is changed by applying a heavy object.

10. The method according to claim 5, wherein the strain calibration material has a shape of plate, and the strain of the strain calibration material is changed by vibration of an applied motor.

11. The method according to claim 5, wherein the short cavity fiber laser is fixed on the material by a fixing unit, and the fixing unit is made of epoxy resin or acrylate.

12. The method according to claim 5, wherein the strain calibration material is metal.

13. The method according to claim 5, wherein the loop mirror comprises a coupler with a splitting ratio of 0.50.

* * * * *